(12) United States Patent
Ferrari et al.

(10) Patent No.: US 8,107,554 B2
(45) Date of Patent: Jan. 31, 2012

(54) TIMING MEASUREMENT FOR CHECKING PROBES

(75) Inventors: Andrea Ferrari, Ferrara (IT); Roberto Padovani, Minerbio (IT)

(73) Assignee: Marposs Societa' per Azioni, Bentivoglio (BO) (IT)

( * ) Notice: Subject to any disclaimer, the term of this patent is extended or adjusted under 35 U.S.C. 154(b) by 852 days.

(21) Appl. No.: 12/087,727

(22) PCT Filed: Jan. 16, 2007

(86) PCT No.: PCT/EP2007/050419
§ 371 (c)(1),
(2), (4) Date: Jul. 14, 2008

(87) PCT Pub. No.: WO2007/082892
PCT Pub. Date: Jul. 26, 2007

(65) Prior Publication Data
US 2009/0122934 A1 May 14, 2009

(30) Foreign Application Priority Data
Jan. 18, 2006 (IT) .............................. BO2006A0031

(51) Int. Cl.
*H04L 27/00* (2006.01)
(52) U.S. Cl. .......... 375/295; 375/354; 33/556; 324/724; 702/168
(58) Field of Classification Search .................. 375/354, 375/295; 33/556; 324/724; 702/168
See application file for complete search history.

(56) References Cited

U.S. PATENT DOCUMENTS

| 4,509,266 A | 4/1985 | Cusack |
| 4,864,294 A | 9/1989 | Fukuhisa |
| 5,473,533 A | 12/1995 | Mengelt |
| 5,638,821 A * | 6/1997 | Nakamura et al. ............ 600/447 |
| 5,977,735 A | 11/1999 | Aab |

FOREIGN PATENT DOCUMENTS

| EP | 0 903 655 | 3/1999 |
| WO | WO 96/36029 | 11/1996 |

OTHER PUBLICATIONS

International Preliminary Report on Patentability (PCT/EP2007/050419).

* cited by examiner

*Primary Examiner* — Curtis Odom
(74) *Attorney, Agent, or Firm* — Dickstein Shapiro LLP (57) ABSTRACT

A system and a method for the transmission of signals representative of an event include a first low frequency clock and a low frequency counter for generating a first delay, and a second high frequency clock and a high frequency counter for generating a second delay. The system further includes a transmitter for transmitting the representative signals after a delay from the event made up by the sum of the first and the second delay. The second delay can be generated also by an analog device including for example a capacitor, and devices for charging the capacitor up to the reaching of a preset voltage at its ends. A wireless transmission system according to the invention is utilized in a checking system with a contact detecting probe, for transmitting a signal representative of contact with the piece to be checked.

21 Claims, 8 Drawing Sheets

Fig. 9

TIMING MEASUREMENT FOR CHECKING PROBES

TECHNICAL FIELD

The present invention relates to a system for the transmission of a signal representative of an event.

The invention also relates to a method for the transmission of a signal representative of an event occurring at a specific instant in time, including the steps of generating a first periodic reference signal, and generating and transmitting the signal representative of the event after a transmission delay that comprises a first delay defined by the first reference signal.

The system and the method of the present invention can be advantageously utilized in contact detecting probes for checking mechanical parts.

BACKGROUND ART

There are known systems for the wireless transmission of signals, utilized, for example, in numerical control machine tools for transmitting signals indicative of the position and/or dimension of mechanical pieces, generated by checking heads or contact detecting probes mounted in the machine. More specifically, in the course of checking cycles, the probes displace with respect to the piece to be checked, touch piece surfaces and respond to contact by generating a contact signal. The contact signal is processed by processing devices for enabling suitable transmission devices to wirelessly transmit signals representative of contact to receiver units. In turn each receiver unit is connected, by means of an interface device, to its associated numerical control unit. By processing other signals relating to the mutual spatial position between probe and piece, the numerical control unit obtains information about the position of the piece surfaces. The transmitted signals can be, for example, electromagnetic signals of optical or radio-frequency type. Typically probes are power supplied by batteries, located right at the interior of the probes. In order to preserve battery life, so avoiding possible operation defects and too frequent substitutions, it is necessary to limit as far as possible power consumption.

In order to accurately identify the contact point between the probe and the piece, it is required that the delays—necessarily introduced when transmitting the state of the probe—be sufficiently short and, above all, accurate and repeatable.

There are known in the art systems and methods that enable to obtain an extremely accurate and repeatable introduced delay.

For example, it is known to activate a pulse generator, or "clock" generator, at the moment when contact between the probe and the piece occurs and keep it activated in the course of the checking, in order to generate a reference signal with highly stable frequency, the cycles of which are counted by a counter, while probe logic circuits perform the required checking operations. The total number of cycles of the reference signal (or, in an equivalent way, of the clock) counted by the counter are preset in a manner so that the operations that the probe logic circuits perform in the course of the checking (for example, operations relating to the transmission of a previous contact signal, or signals representative of the state of the probe) are always completed before the count ends. At the end of the count, an output signal indicative of contact is transmitted to receiver units.

Figure 1:
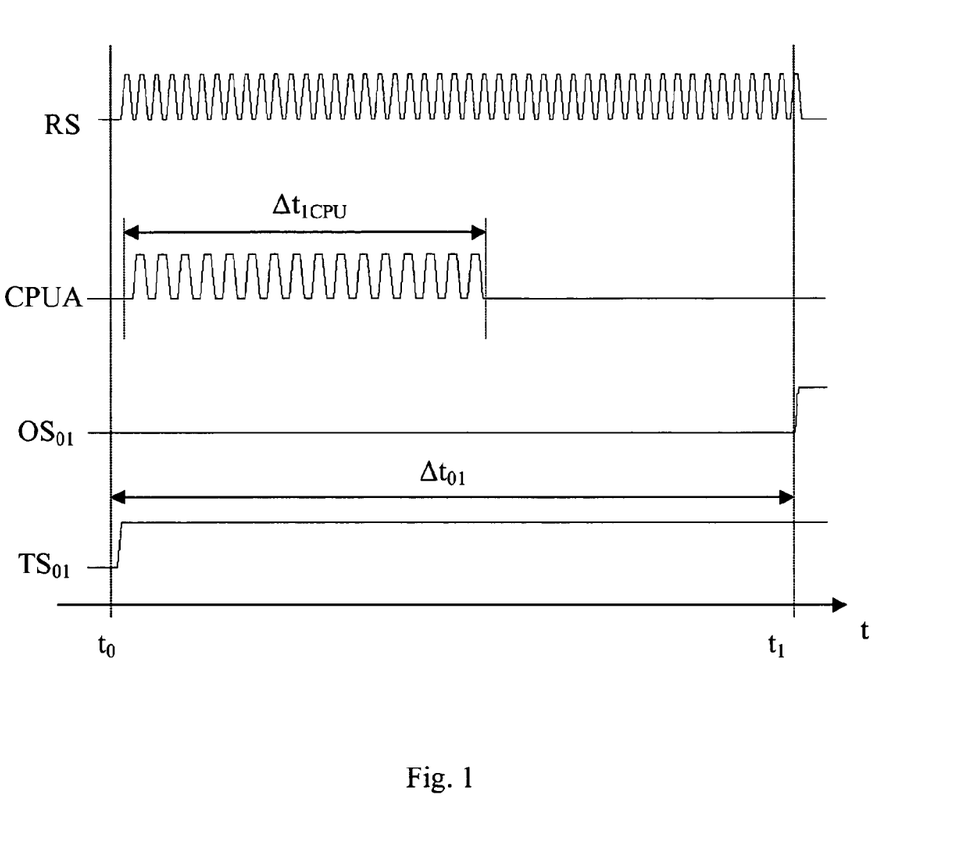
FIGS. 1, 2 and 3 are graphs schematically showing the trend as a function of time of some signals in known transmission systems.
Figure 2:
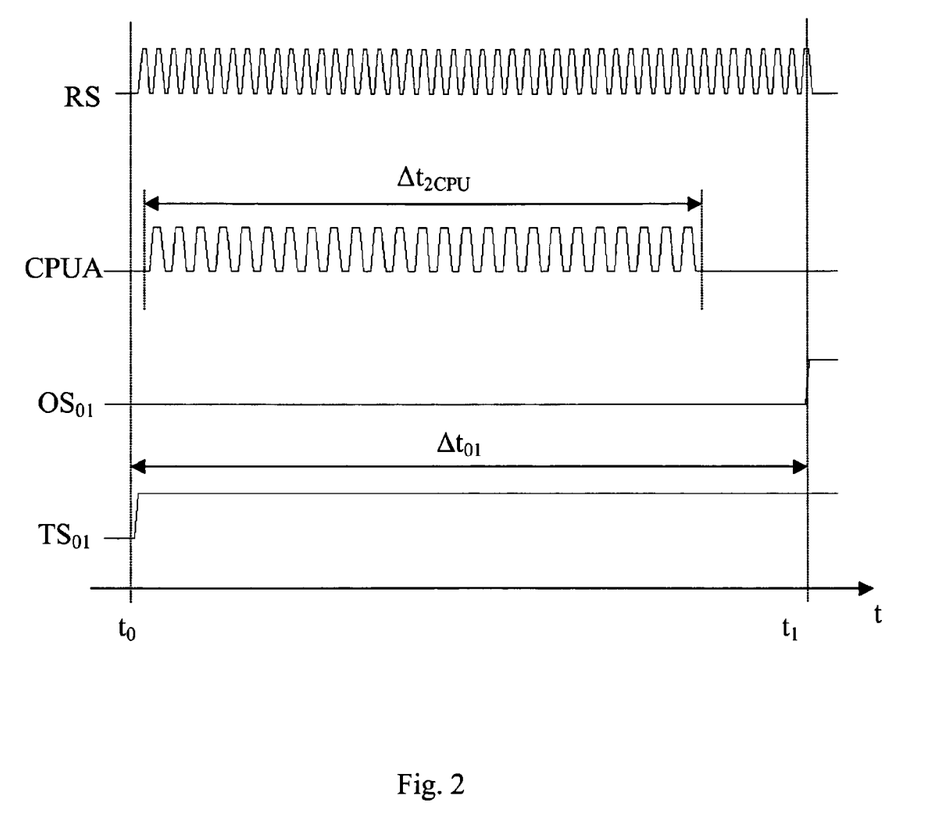

FIGS. 1 and 2 show, in simplified form, what mentioned above in case of two different time intervals, $\Delta t_{1CPU}$ and $\Delta t_{2CPU}$, respectively, necessary for allowing the probe logic circuits to complete the required checking operations. More specifically, the figures show the trend—as a function of time t in the time interval between an instant $t_0$ (moment when contact occurs) and an instant $t_1$ (moment of transmission of the output signal)—of a reference signal RS, of a signal CPUA representative of the operations carried out by the logic circuits after contact, of an output signal $OS_{O1}$ and of a contact signal $TS_{O1}$. It can be realized that the output signal $OS_{O1}$ of both FIGS. 1 and 2, is generated and transmitted at the instant $t_1$ after an identical delay $\Delta t_{O1}$ starting from the instant $t_0$ regardless of the time interval $\Delta t_{1CPU}$ and $\Delta t_{2CPU}$ of the signal CPUA, i.e. the duration of the operations performed by the probe logic circuits in the course of the checking. According to this known method, the accuracy of the delay $\Delta t_{O1}$ generated between contact and transmission of the associated signal is strictly correlated to the stability of the frequency of the reference signal and to the short activation (or "start-up") time of the clock, defined as the time necessary for the clock to activate further to an edge of the contact signal, or other suitable signal. In order to have a reference signal which is stable in frequency for a long time interval with respect to the period of the signal, it is necessary to implement the clock by means of, for example, a quartz crystal resonator or similar devices. However, these devices have variable and long start-up times, in the order of tens of thousands of times the period of the generated signals. In practice, there are not known in the art devices, as oscillators or resonators, that concurrently provide stable frequencies for relatively long time intervals and relatively short start-up times. Furthermore, it is known that the energy consumption of an oscillator increases as its oscillation frequency increases.

A different method, substantially alike the method mentioned at the beginning of the description, foresees the activation of the crystal resonator at the start of the checking (before contact occurs), while just the counter is activated at the edge of the contact signal.

In this case the selection of the frequency of the reference signal is critical because the oscillation period defines the resolution that would be obtained in the amount of time delay between the instant of contact and the start of the transmission of the output signal.

In fact, the counter cannot activate at any whatever moment, but must wait for a change of state, in other words an edge, typically the rising edge, of the reference signal.

Figure 3:
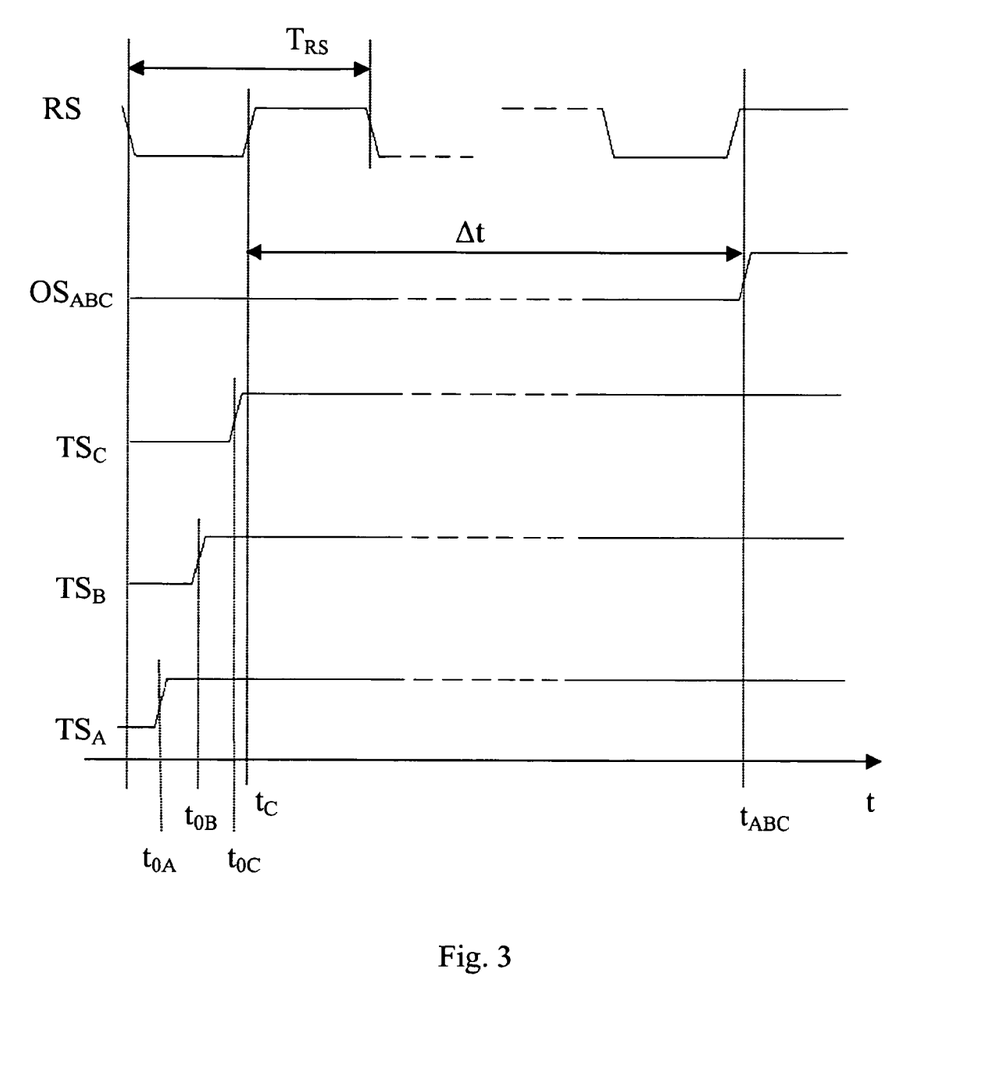

The consequence of the above can be readily seen in FIG. 3 where a relatively slow clock (that generates a reference signal RS with a relatively long period $T_{RS}$) is shown and three contact signals $TS_A$, $TS_B$, $TS_C$ are represented at three different moments of contact $t_{OA}$, $t_{OB}$, $t_{OC}$; for all the signals $TS_A$, $TS_B$, $TS_C$ the count always starts at a time $t_C$ at the same first rising edge of the reference signal RS subsequent to contact, so that their original time separation no longer exists and an output signal $OS_{ABC}$ is generated and transmitted for all signals at the same time $t_{ABC}$, exactly after an identical delay $\Delta t$ from the instant $t_C$.

In order to overcome this kind of problem, European patent application EP-A-0826201 suggests to slightly alter (to increase or to decrease) the period of the output signal representative of contact, so as to keep the delay between contact and the end of the transmission of the output signal constant.

Another manner to overcome the above mentioned problem foresees to increase the resolution of the delay time, by increasing the frequency of the reference signal.

In the previously described applications, a typically requested resolution is in the order of 1 µs, that corresponds to a minimum frequency of the reference signal of 1 MHz. Operating at similar frequencies is quite problematic in a battery-powered system, owing to the high and constant consumption of current of the associated clock.

Therefore, in the checking systems equipped with battery-powered contact detecting probes, it would be expedient to utilize an oscillator/resonator that guarantees a short start-up time and a reference signal with stable frequency in time, in order to assure transmission with good repeatability characteristics. Furthermore, there is the requirement of low energy consumption to extend the battery life.

Unfortunately, as hereinbefore stated, it is practically impossible to have all these characteristics in a single oscillator/resonator and it is necessary to accept, often unsatisfactory, compromise solutions in the existing known systems and methods.

DISCLOSURE OF THE INVENTION

An object of the present invention is to provide a system and a method for the wireless transmission of signals that enable to achieve high standards of performance in terms of transmission accuracy and/or repeatability, more specifically with regard to the delay between the instant when a significative event occurs and the start of the transmission of signals indicative of such event, and concurrently low energy consumption.

This and other objects are attained by a system according to claim 1 and a method according to claim 13.

A system and a method according to the invention enable to minimize the consumption of electric energy and thus utilize, in an advantageous way and at a high standard of performance, battery-powered contact detecting probes for checking mechanical parts, for example mechanical pieces and tools.

A further advantage that the present invention offers is that of guaranteeing accurate and repeatable systems even by utilizing low-cost component parts and hardware systems.

These and other advantages will become apparent in the following description.

A system for the wireless transmission of signals according to the invention can be utilized, for example, in contact detecting probes for numerical control machine tools, and includes circuit systems and/or component parts for receiving a signal indicative of an event, for example a contact signal indicative of contact occurring between the probe and a piece to be checked, at least two generators of reference signals, at least one of the letters being periodic, processing means including at least one counter for counting a preset number of cycles of at least one of the reference signals and a transmitter of output signals indicative of the event under consideration. The processing means generate two distinct delays that, when combined, define a particularly accurate and repeatable overall delay between event under consideration and start of the transmission of the associated output signal. More specifically, a first generator is highly stable and is utilized for generating most of the overall delay, while a second generator is relatively less accurate, though it has short start-up times and is utilized for generating just a relatively short interval of the overall delay.

In a method according to the invention the first generator, that generates a periodic reference signal, is operative when the system is in operation mode, while the second generator, that generates a second reference signal, is activated when an event occurs, for example contact between a contact detecting probe and a piece, precisely when a signal indicates such contact. The processing means check the value of a parameter of the second reference signal between the activation of the second generator (which corresponds with accurate approximation to the instant when contact occurs) and, for example, the first subsequent rising edge of the first reference signal. It should be realized that the check is carried out for a short time interval, more specifically shorter than the period of the first reference signal. At the first subsequent rising edge of the first reference signal, the check of the parameter of the second reference signal is stopped and a current value of the parameter is memorized. At this point the processing means count, by means of a counter, a preset number of cycles of the first reference signal and other circuits and/or devices of the system, for example the second generator, can be advantageously turned off.

At the end of the count of the preset number of cycles of the first reference signal, the second generator is activated again and the processing means continue the check of the parameter of the second reference signal starting from the previously detected value up to a preset value. Upon reaching the preset value, an output signal indicative of contact between the probe and the piece can be wirelessly transmitted.

BRIEF DESCRIPTION OF THE DRAWINGS

Other features of the invention will appear more clear from the following detailed description and the accompanying sheets of drawings, given by way of not limiting examples only, wherein.

BEST MODE FOR CARRYING OUT THE INVENTION

Figure 4:
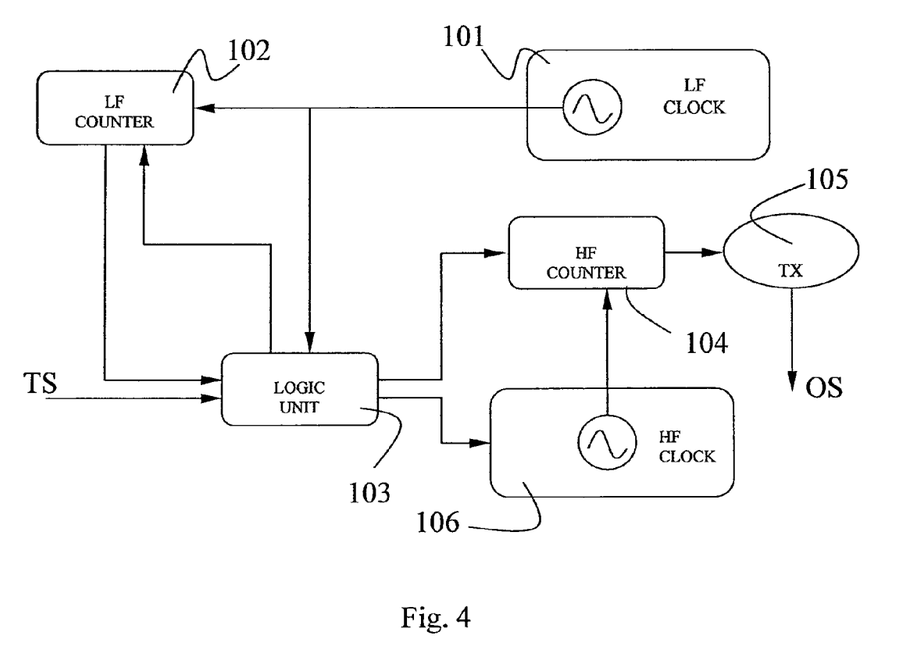
FIG. 4 is a simplified functional block diagram of a transmission system according to a first preferred embodiment of the invention.

With reference to FIG. 4, a transmission system according to the present invention includes a first generator of synchronizing pulses, or first, low-frequency clock 101. The low-frequency clock 101, that generates a first periodic reference signal at a first, low frequency, can be implemented, for example, by means of a quartz crystal oscillator that, as known, has characteristics according to which the lower its frequency, the lesser the electric energy consumption. As an example, a quartz oscillator oscillating at a frequency of 32768 Hz can operate at an average electric current consumption in the order of 1 μA. An output of the low-frequency clock 101 is connected to processing means, that include a first low-frequency counter 102, a second, high frequency counter 104 and a logic unit 103. More specifically, the output of the low frequency clock 101 is connected to suitable inputs of the first low frequency counter 102 and of the logic unit 103. In the course of normal operation, the logic unit 103 and the low frequency clock 101 are always power supplied. The logic unit 103 also receives in input a signal representative of an event, for example a contact signal TS indicative of contact between a contact detecting probe and a piece to be checked, and an output of the low frequency counter 102. The logic unit 103 has three outputs: a first output towards the low frequency counter 102, a second output towards a second generator of synchronizing pulses, or second high frequency clock 106, and a third output towards the second, high frequency counter 104. The high frequency clock 106 generates a second periodic reference signal at a second, high frequency and includes logic activation circuits. The logic unit 103 zero sets the high frequency counter 104, the latter also receives, at a suitable input, an output of the high frequency clock 106 and provides a signal for controlling a known-type transmitter 105 to transmit an output signal OS representative of contact. The high frequency clock 106 can be implemented in many ways, for example by means of a high frequency oscillator, provided the latter has a short start-up time. In other words, the long term stability feature can be set aside to the advantage of a shorter start-up time.

The reason for which it is possible to set aside the long term stability of the high frequency clock 106, tolerate noises and even high phase distortions, is that the high frequency clock 106 has the sole task of generating pulses for a very short time interval, advantageously in the order of the period of the low frequency clock 101, as hereinafter described. Thus, the time error that the high frequency clock 106 could accumulate is in any case limited and practically of no influence over the overall delay. For example, by implementing the low frequency clock 101 by means of a quartz crystal oscillator, that generates pulses at a frequency of approximately 30000 Hz, and having the availability of a high frequency clock 106, that generates pulses at a frequency of 1 MHz with 3% accuracy, the error caused by the high frequency clock 106 in a whole period of the signal generated by the low frequency clock 101 is approximately 1 μs. Moreover, with a quartz crystal low frequency oscillator operating at 32768 Hz, a resolution of 1 μs or 0.5 μs in the transmission delay between the contact signal TS and the start of the transmission of the output signal OS can be achieved by implementing the high frequency clock 106 by means of an oscillator operating at 1 or 2 MHz, respectively.

The clocks 101 and 106, the counters 102 and 104 and the logic unit 103 can be appropriately integrated in a logic of the CMOS static low consumption type or implemented by means of other analogous low consumption technology.

The transmission system illustrated in FIG. 4 can be advantageously utilized by a method according to the invention, now described with reference to FIG. 5, for transmitting an output signal indicative, for example, of contact between a feeler of a contact detecting probe and a piece to be checked with a constant and repeatable delay between the instant when contact occurs and the start of the transmission of the output signal.

The method foresees turning the transmission system on when the checking starts (step 110), more specifically power supplying the low frequency clock 101 for generating the first low frequency reference signal, and power supplying the logic unit 103. Under this condition, the system is in stand-by, low energy consumption mode. The method further includes the steps of verifying whether contact between the probe and the piece has occurred (step 120), and "awaking" the system further to contact for placing the latter in a fully operative mode (step 130). More specifically when contact occurs, the logic unit 103 controls, by means of the logic activation circuits, the turning on of the high frequency clock 106 for generating the second high frequency reference signal and concurrently the zero setting of the high frequency counter 104. Further to contact, the high frequency counter 104 starts a check of a parameter of the second reference signal, more specifically a count of the number of cycles of the high frequency reference signal (step 140) between the instant of contact and a rising edge of the low frequency clock 101, advantageously the first subsequent rising edge. At every count of the high frequency counter 104, the presence, or not, of the first subsequent rising edge of the low frequency reference signal is verified (step 150).

If such rising edge is present, a number P of cycles of the high frequency reference signal up to here counted is memorized by means of the logic unit 103 (step 160), the high frequency clock 106 can be advantageously deactivated (step 170), and the low frequency counter 102 is zero-set while the count of the cycles of the low frequency reference signal is activated (step 180). The steps 160, 170 and 180 substantially take place at the same instant, at the first rising edge of the low frequency signal subsequent to contact.

It should be realized that the low frequency counter 102 is driven by a very stable source (the low frequency clock 101) and thus can accurately count for time intervals in the order of tens of milliseconds. It should also be realized that, in the course of the count carried out by the low frequency counter 102, the other devices/circuits can be advantageously turned off, more specifically (as indicated at step 170) the high frequency clock 106, that, as previously stated, is particularly costly in terms of energy consumption. In this way the consumption of electric current can be reduced to a minimum.

The count of the number of cycles of the low frequency reference signal continues up to a preset number $Q_{LF}$ (step 190); once the latter number has been reached, the logic unit 103 freezes the low frequency counter 102 and turns on again the high frequency clock 106 (in the event the clock had previously been turned off) by means of the logic activation circuits (step 200). At the moment when the high frequency clock 106 is turned on, the checking of the parameter of the second reference signal continues, in other words the high frequency counter 104 continues the count of the number of cycles of the high frequency reference signal, starting from the previously memorized number P (step 210).

Upon reaching a preset number $Q_{HF}$ of cycles (step 220), the high frequency clock 106 can be turned off and the high frequency counter 104 frozen, and the system transmits an output signal indicative of contact between the probe and the piece (step 230).

It should be realized that from the moment when contact occurs to the moment when the output signal is transmitted there elapses a highly repeatable time interval made up of the sum of the delay generated by the low frequency counter 102 (period of the low frequency reference signal times the preset number $Q_{LF}$), of the delay generated by the high frequency counter 104 (period of the high frequency reference signal times the preset number $Q_{HF}$) and of the time necessary for activating twice the high frequency clock 106.

In order to eliminate any dependency of the delay generated by the high frequency counter 104 on the fraction of period elapsing between contact and the first rising edge of the low frequency reference signal, the high frequency counter 104 must be programmed to count up to a preset number $Q_{HF}$ of cycles that satisfy the following condition:

$$Q_{HF} > (T_{LF}/T_{HF}) + 1 \qquad (1)$$

where $T_{LF}$ and $T_{HF}$ are the periods of the low frequency reference signal and of the high frequency reference signal, respectively. Among all the integer numbers that satisfy the condition (1), $Q_{HF}$ can advantageously take the minimum value.

Figure 5:
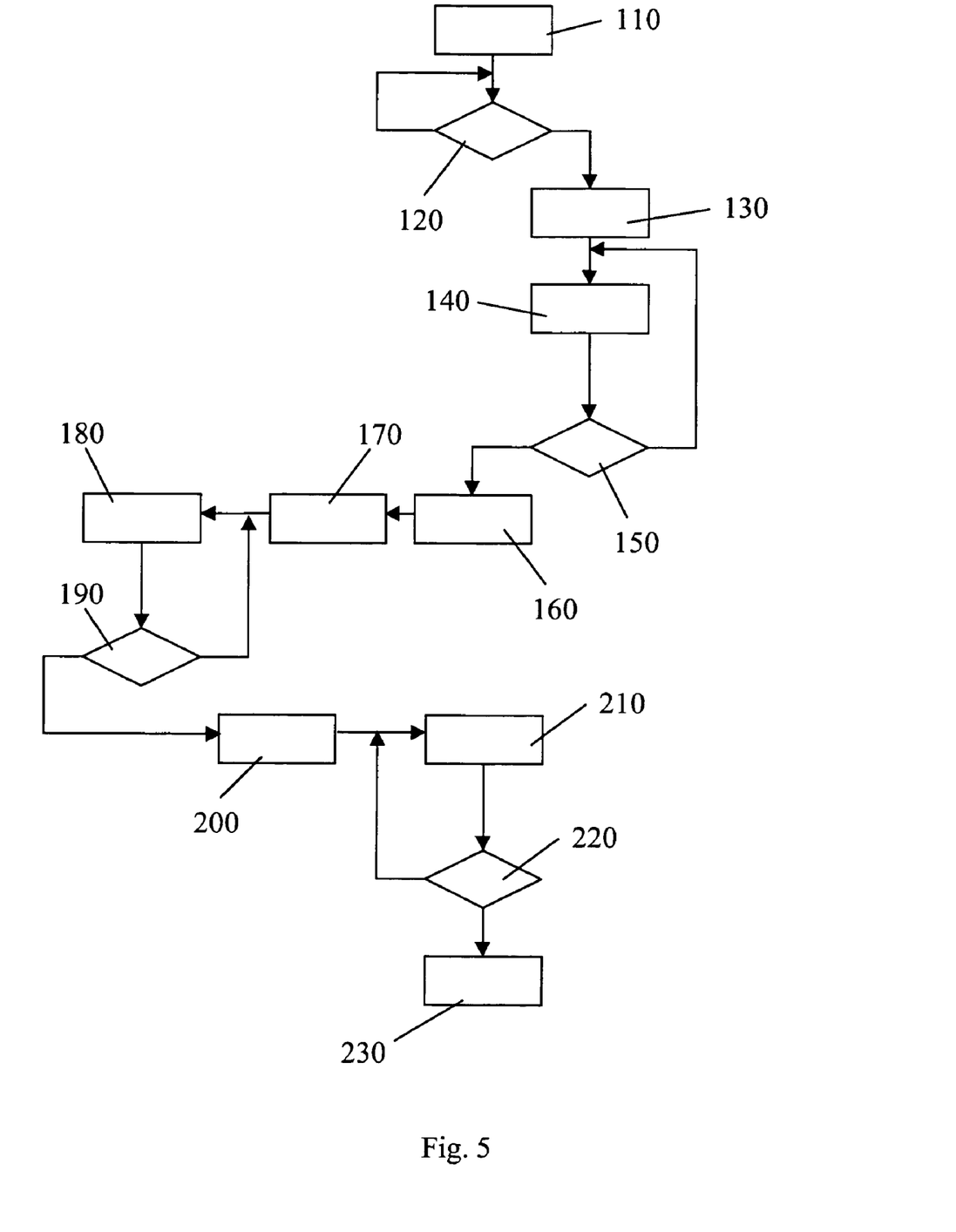
FIG. 5 is a logic block diagram showing a method according to the invention.
Figure 6:
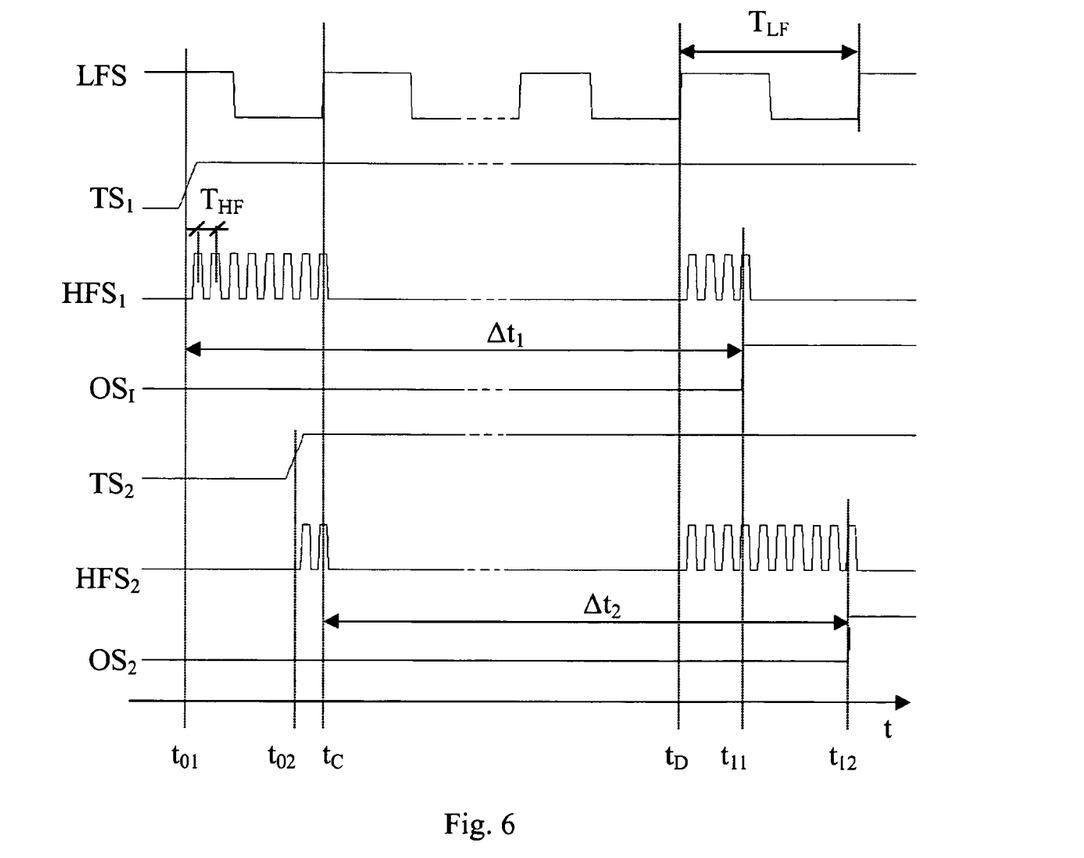
FIG. 6 is a graph showing the instants of transmission of the output signals representative of two distinct events in the transmission system of FIG. 4 utilizing the method of FIG. 5.

FIG. 6 shows, in simplified form, the trend as a function of time of two output signals $OS_1$ and $OS_2$ generated by the system of FIG. 4 utilizing the method of FIG. 5, in the case of two contact signals $TS_1$ and $TS_2$ generated at two different moments $t_{01}$ and $t_{02}$, respectively, but in any case within an identical period $T_{LF}$ of the low frequency reference signal generated by the first low frequency clock 101 and identified by reference LFS in FIG. 6. In both cases $Q_{LF}$ and $Q_{HF}$ are constant and $Q_{HF}$ is, for example, 12. It is assumed that the second high frequency clock 106 has a known start-up time $\Delta t_{HF}$. It should be realized that such start-up time $\Delta t_{HF}$ is extremely limited and in any case negligible (for this reason not shown in FIG. 6).

In the case of the first contact signal $TS_1$, the logic unit 103 activates, by means of the logic activation circuits, the high frequency clock 106 that generates a signal $HFS_1$ after the start-up time $\Delta t_{HF}$. The counter 104 starts to count the cycles of the signal $HFS_1$. When the first subsequent rising edge of the signal LFS is detected at an instant $t_C$, the logic unit 103 stops the count of the counter 104, freezes the number P up to that moment counted (in the example of FIG. 6 it is 8) and activates the low frequency counter 102 that counts a preset number of cycles $Q_{LF}$ of the signal LFS (that define a first delay $\Delta TL$), up to a time $t_D$. In the course of the $Q_{LF}$ cycles, the high frequency clock 106 can be turned off. At the end of the $Q_{LF}$ cycles, the logic unit 103 activates again the high frequency clock 106 by means of the logic activation circuits (the introduced delay is equal to the start-up time $\Delta t_{HF}$) and the high frequency counter 104 restarts counting the cycles of the signal $HFS_1$, from the previously memorized (8) number P up to the value $Q_{HF}$ (12), i.e. in the specific case, 4. An output signal $OS_1$ is sent at an instant $t_{11}$ at the end of the count of the counter 104, with a total transmission delay $\Delta t_1$ between the instant of contact $t_{01}$ and the instant $t_{11}$ equal to 12 (namely 8+4) cycles of the signal $HFS_1$ (that altogether define a second delay $\Delta TH$) and of the first delay $\Delta TL$ defined by the $Q_{LF}$ cycles of the signal LFS, besides twice the start-up time $\Delta t_{HF}$ of the high frequency clock 106 (negligible, as previously stated).

It should be realized that, according to the previously mentioned condition (1), the duration in time of the second delay $\Delta TH$ (that is $Q_{HF} * T_{HF}$) is longer than that of a period ($T_{LF}$) of the first reference signal LFS.

In the case of the second contact signal $TS_2$, that is generated at an instant $t_{02}$ differing from the instant $t_{01}$ when there is generated the contact signal $TS_1$ (but anyway always within a same period $T_{LF}$ of the signal LFS), the logic unit 103 activates, by means of the logic activation circuits, the high frequency clock 106, that generates, analogously to the previous case, a signal $HFS_2$, after a start-up time $\Delta t_{HF}$. However, in this second case, the signal $HFS_2$ performs just two cycles (P=2) before it encounters, again at the instant $t_C$, the first subsequent rising edge of the signal LFS generated by the low frequency clock 101 (the same rising edge considered in the previous case). Analogously to the previous case, the high frequency clock 106 can be turned off while the low frequency counter 102 counts the $Q_{LF}$ cycles of the signal LFS (the first delay $\Delta TL$) up to the time $t_D$, at the end of which the high frequency clock 106 is activated again (the introduced delay is always equal to the start-up time $\Delta t_{HF}$) and the high frequency counter 104 counts ($Q_{HF}$–P) cycles of the signal $HFS_2$. In the specific example ($Q_{HF}$–P)=10. At the end of the count, at a time $t_{12}$ and after a delay $\Delta t_2$ from the instant of contact $t_{02}$, a second output signal $OS_2$ is transmitted. In this case too, the delay $\Delta t_2$ is equal to 12 (namely 2+10) cycles of the signal $HFS_2$ (the second delay $\Delta TH$) and the $Q_{LF}$ cycles of the signal LFS (the first delay $\Delta TL$), besides twice the start-up time $\Delta t_{HF}$ of the high frequency clock 106 (negligible, as previously stated). In other words the delay $\Delta t_2$ is substantially equal to the delay $\Delta t_1$.

In a preferred embodiment there are utilized commercial component parts, like a quartz crystal oscillator at 32768 Hz (approximately 30.5 µs period) as first low frequency clock 101 and a ring oscillator RC at 1 MHz (1 µs period) with 2 µs start-up time as second high frequency clock 106. By suitably choosing the values of $Q_{LF}$ and $Q_{HF}$, it is possible to generate, for example, a transmission delay from the instant of contact to the transmission of the output signal of 5 ms with an accuracy of ±2.5 µs and an average current consumption less than 25 µA at 3.0 V power supply voltage, or less than 15 µA in the case of 2.4 V power supply voltage.

Figure 7:
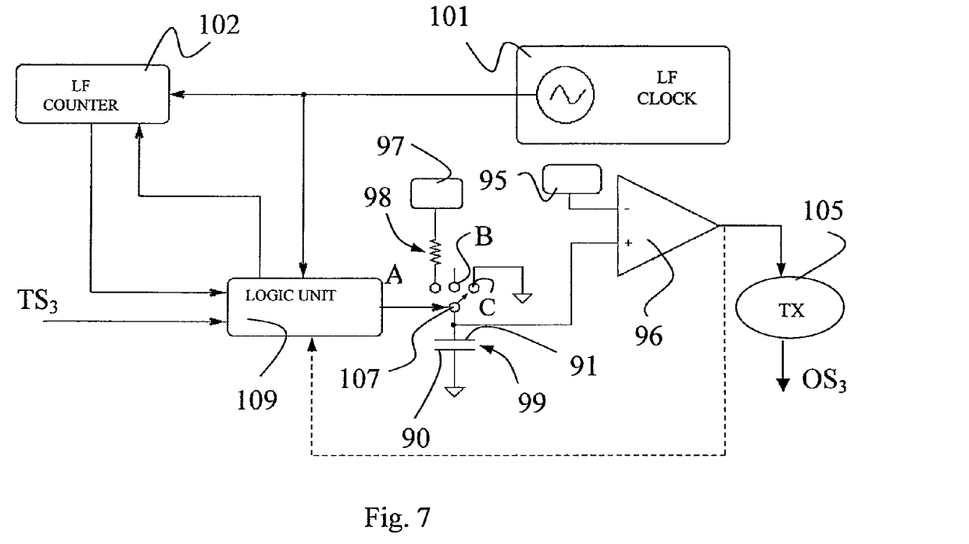
FIG. 7 is a simplified functional block diagram of a transmission system according to a second preferred embodiment of the invention.

According to an alternative embodiment shown in FIG. 7, the high frequency clock 106 and the high frequency counter 104 of the transmission system shown in FIG. 4 have been replaced with analog component parts, so as to implement a transmission system according to the invention of analog/digital type.

The transmission system of analog/digital type according to the invention and its operation are hereinafter described with reference to FIGS. 7 and 8, in which references like those of FIGS. 4 and 6 are used to denote like or similar component parts or signals.

The transmission system of FIG. 7 includes a first generator of synchronizing pulses, or first low frequency clock 101 that generates a first low frequency reference signal LFS and is connected to processing means including a low frequency counter 102, a logic unit 109, a selector switch 107 and a comparator 96. More specifically, the low frequency clock 101 is connected to suitable inputs of the low frequency counter 102 for counting a preset number Q.sub.LF of cycles of the signal LFS and to suitable inputs of the logic unit 109, which further receives at its input an output of the low frequency counter 102, a signal TS.sub.3 representative of an event, for example contact between a contact detecting probe and a piece to be checked, and a signal representative of an output signal of the comparator 96. When the contact detecting probe starts a checking cycle, the low frequency clock 101 is power supplied (as well as the logic unit 109) for generating the reference signal LFS. In turn the logic unit 109 has two outputs, a first output connected to the low frequency counter 102 and a second output connected to the selector switch 107 that defines three possible connections for a capacitor 99 with a first plate 90 typically connected to ground. In a first position A, the selector switch 107 connects (for example in series) the capacitor 99 to a resistance 98. In this first position A, the resistance 98 and the capacitor 99 are power supplied by a first voltage generator 97. The first voltage generator 97, the resistance 98 and the capacitor 99 implement a circuit RC with known charge trend that defines a second generator for generating a second reference signal. The circuit RC can be replaced with a reactive circuit including, for example, an impedance. As hereinafter described in more detail, the generated signal is an analog signal representative of a magnitude variable in a known way. More specifically, with regard to the circuit RC shown in FIG. 7, the generated analog signal is representative of a voltage, and the voltage is the very parameter whose value is to be checked.

When contact occurs at a time $t_{03}$, a contact signal $TS_3$ arrives at the logic unit 109 and the latter controls the selector switch 107 to switch to the first position A. The first voltage generator 97 starts to charge the capacitor 99 up to the moment when the logic unit 109 detects a rising edge of the signal LFS, advantageously the first subsequent rising edge at a time $t_C$. At the first subsequent rising edge, the logic unit 109 controls the selector switch 107 to switch to a second position B in which the capacitor 99 is electrically insulated, hence the charging of the capacitor 99 is interrupted at a specific voltage value $V_1$ that will depend on the time interval between the event ($t_{03}$) and the first subsequent rising edge of the signal LFS ($t_C$). In FIG. 8 the reference VS indicates the second reference signal defined by the trend of the voltage value at the ends of the capacitor 99 as a function of time. As in the case of the system of FIG. 4, the low frequency counter 102 counts a preset number $Q_{LF}$ of cycles of the signal LFS starting from the first rising edge subsequent to contact. At a time $t_D$, once the low frequency counter 102 has ended the counting of the $Q_{LF}$ cycles of the signal LFS, the logic unit 109 controls the selector switch 107 to switch back to the first position A and the capacitor 99 restarts charging and the voltage at its ends increases starting from the previously reached value $V_1$.

A non-inverting input of the comparator 96 is connected to an end of the capacitor 99, while an inverting input of the same comparator 96 is connected to a second voltage generator 95 at reference voltage $V_{ref}$. More specifically, regardless of the position of the selector switch 107, when the voltage at the ends of the capacitor 99 reaches a value $V_2$ equal to (or above) the reference voltage $V_{ref}$, the comparator 96 sends an output, non-null signal. On the contrary, when the voltage at the ends of the capacitor 99 is less than the reference voltage $V_{ref}$, the output of the comparator 96 is null.

Once the reference voltage $V_{ref}$ is exceeded and hence the comparator 96 has emitted an output, non-null signal, such output signal can be used for controlling, at a time $t_{13}$, by means of a transmitter 105 of a known type, the transmission of a signal $OS_3$ representative of the event under consideration and for providing the logic unit 109 with the information that the capacitor 99 must be discharged for the subsequent check (in FIG. 7 a dashed line indicates, in an extremely simplified and schematic way, the connection between the comparator 96 and the logic unit 109). Thus, the logic unit 109 controls the selector switch 107 to switch to a third position C in which the capacitor 99 is discharged, for example, by connecting to ground a second plate 91 too.

It should be appreciated that even in the embodiment of FIG. 7 the energy consumption of the circuit is particularly limited as, in the course of the count of the $Q_{LF}$ cycles of the low frequency signal LFS, the selector switch 107 is in the second position B and in this position the electric current consumption is practically null.

Figure 8:
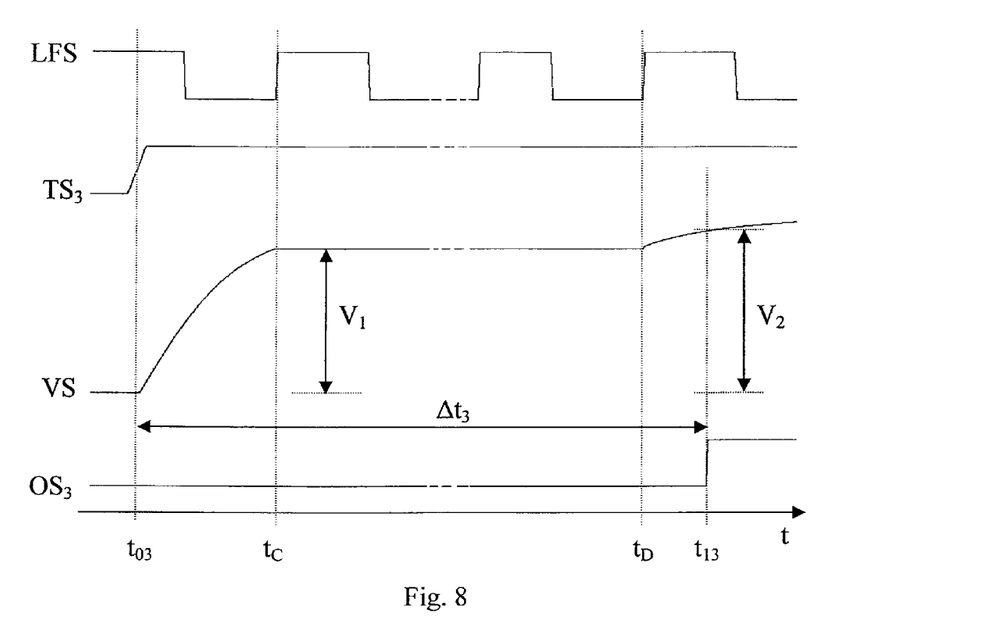
FIG. 8 is a graph showing the instant of transmission of the output signal representative of an event in the transmission system of FIG. 7.

With reference to FIG. 8, it is clear that an accurate and repeatable time interval $\Delta t_3$ elapses between the time $t_{03}$ and the time $t_{13}$. In fact, it should be noted that such interval $\Delta t_3$ is formed by $Q_{LF}$ periods of the signal LFS (that define, as in the case shown in FIGS. 4 and 6, a first delay $\Delta TL$) and by the amount of time it takes the capacitor to charge from a null value to the value $V_1$ (at the first rising edge of the signal LFS) and from the value $V_1$ to the value $V_2$ (equal to the reference voltage $V_{ref}$ of the comparator 96). It should also be noted how the amount of time necessary for charging the capacitor 99 from a null value to the value $V_2$ (time that defines a second delay $\Delta TV$) does not depend on the moment when the event occurs with respect to the first rising edge of the signal LFS, but only on the features of the RC circuit.

The value $V_2$ ($V_{ref}$) is chosen and preset in a way that, as occurs in the embodiment of FIG. 4, the second delay $\Delta TV$ is (only by a small amount) longer than the period $T_{LF}$ of the first reference signal LFS.

Figure 9:
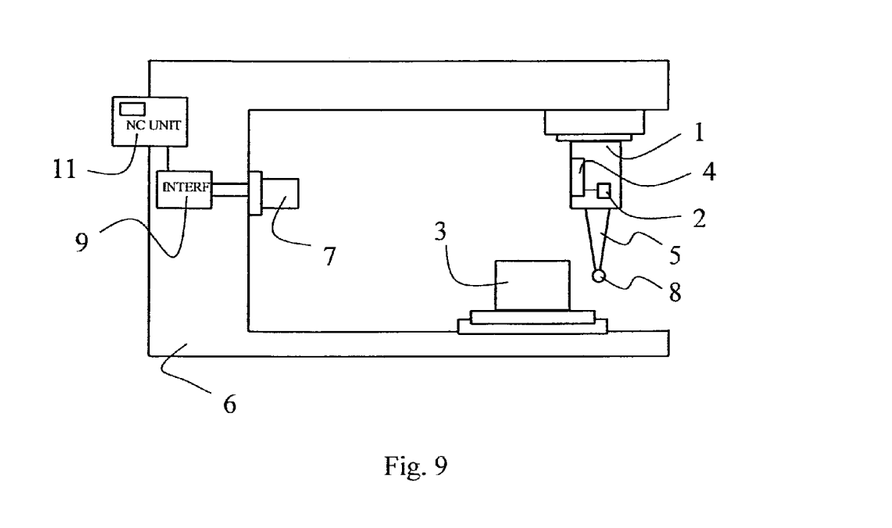
FIG. 9 is a schematic view of a machine tool carrying a contact detecting probe with a transmission system according to the invention.

As mentioned above, a system and a method according to the invention can be advantageously implemented in contact detecting probes mounted on machine tools for checking mechanical pieces before, during and after the machining. FIG. 9 schematically illustrates a system for detecting the position or the dimensions of a mechanical piece 3 mounted on a machine tool 6, with a checking probe, for example a contact detecting probe 1 with a movable arm 5 carrying a feeler 8. A detecting device 2 of a known type provides a contact signal when, further to mutual displacements between the probe 1 and the piece 3, the feeler 8 contacts a surface of the piece 3. A transmission system 4 with the features of the transmission systems so far described and illustrated with reference to FIG. 4-6 or 7-8 is connected (in a known way) to the detecting device 2, receives the contact signal and wirelessly transmits signals representative of contact to a receiver 7 located at a distance from the probe 1 and connected, by means of an interface device 9, to a numerical control unit 11 of the machine tool 6. By processing other signals relating to the mutual spatial position between the probe 1 and the piece 3, the numerical control unit obtains information regarding the position of the surfaces of the piece 3. The wirelessly transmitted signals can be, for example, of the optical, or radio-frequency type and utilize known technology, like Bluetooth®, WiFi® and UWB ("Ultra-Wideband"). Furthermore, there can be foreseen devices for wireless transmitting signals from the receiver 7 to the probe 1, for example for the activation/deactivation of on-board probe circuits or for programming determined parameters, in a known way and that do not directly regard the present invention.

In general terms, a transmission system according to the invention can be utilized whenever there be a need of an accurate, repeatable and low energy consumption system for the transmission of signals representative of events.

The invention claimed is:

1. A transmission system for the transmission of a signal representative of an event, the system comprising:
    a first generator, for generating a first periodic reference signal,
    a second generator, for generating a second reference signal,
    processing means adapted for generating a first delay on the basis of the first periodic reference signal, and a second delay on the basis of the second reference signal, and
    a transmitter adapted for transmitting said representative signal with a transmission delay from the event, the transmission delay being defined by a sum of said first and said second delays, wherein one of said first and said second delays is longer than the other.

2. The transmission system according to claim 1, wherein said processing means include a first counter and are adapted for generating said first delay on the basis of a preset number of periods of the first periodic reference signal.

3. The transmission system according to claim 1, wherein the processing means include a logic unit connected to said first and to said second generators.

4. The transmission system according to claim 1, wherein said first generator is a generator of synchronizing pulses.

5. The transmission system according to claim 4, wherein said first generator is a quartz crystal oscillator.

6. The transmission system according to claim 2, wherein said second generator is adapted for generating a second periodic reference signal, the processing means including a second counter and being adapted for generating said second delay on the basis of a preset number of periods of the second reference signal.

7. The transmission system according to claim 6, wherein said second generator is a generator of synchronizing pulses.

8. The transmission system according to claim 7, wherein said second generator is a RC ring oscillator.

9. The transmission system according to claim 6, wherein at least one of said first and said second generators, and said first and said second counters are integrated in a static-type CMOS logic.

10. The transmission system according to claim 6, wherein said first periodic reference signal has a first frequency, and said second periodic reference signal has a second frequency higher than the first frequency.

11. The transmission system according to claim 1, wherein said second generator includes circuits adapted for generating an analog signal representative of a variable magnitude, the processing means including a comparator and being adapted for generating said second delay on the basis of a preset value of said magnitude.

12. The transmission system according to claim 11, wherein said second generator includes a capacitor, said processing means including a selector switch adapted for controlling the charge of the capacitor.

13. A system for checking the position and/or the dimensions of a mechanical part including
   a checking probe with a movable arm carrying a feeler,
   a detecting device adapted for providing a contact signal indicating a contact between the feeler and the mechanical part,
   a transmission system according to any one of claims 1 to 12 adapted for wireless transmission of a signal indicative of said contact, and
   a receiver adapted for receiving said signal indicative of said contact.

14. A method for the transmission of a signal representative of an event occurring at a specific instant in time, comprising the steps of:
   generating a first periodic reference signal,
   generating and transmitting a signal representative of the event after a transmission delay that comprises a first delay defined by the first periodic reference signal,
   activating generation of a second reference signal starting from an instant of activation substantially corresponding to an instant at which the event occurs,
   checking a value of a parameter of the second reference signal, and
   identifying a second delay on the basis of reaching of a preset value of said parameter of the second reference signal,
   the transmission delay being defined as a sum of said first and said second delays, starting from said instant of activation.

15. The method according to claim 14, further comprising:
   detecting, after the instant of activation, the start of a period of the first periodic reference signal,
   consequently interrupting the checking of the value of said parameter of the second reference signal,
   memorizing a current value of the checked parameter,
   checking whether a preset number of periods of the first periodic reference signal corresponding to said first delay is reached,
   resuming the checking of the value of said parameter of the second reference signal starting from the current memorized value, and
   checking whether the preset value of said parameter is reached.

16. The method according to claim 15, further comprising the steps of:
   interrupting and activating again the generation of the second reference signal respectively after the checking of the value of said parameter is interrupted and before said checking is resumed.

17. The method according to claim 14, wherein a duration of said second delay is not shorter than that of a period of the first periodic reference signal.

18. The method according to claim 14, wherein the second reference signal is a periodic signal at a frequency higher than a frequency of the first periodic reference signal.

19. The method according to claim 18, wherein said parameter of the second reference signal is a number of periods.

20. The method according to claim 14, wherein the second reference signal is an analog signal representative of a variable magnitude.

21. The method according to claim 20, wherein said parameter of the second reference signal is a voltage.

* * * * *